(12) United States Patent
Eberle et al.

(10) Patent No.: US 6,590,020 B1
(45) Date of Patent: Jul. 8, 2003

(54) STABILIZED POLYOXYMETHYLENE MOULDING MATERIALS

(75) Inventors: Wolfgang Eberle, Ludwigshafen (DE); Burkhardt Dames, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/719,817

(22) PCT Filed: Jun. 15, 1999

(86) PCT No.: PCT/EP99/04121

§ 371 (c)(1),
(2), (4) Date: Dec. 18, 2000

(87) PCT Pub. No.: WO00/00547

PCT Pub. Date: Jan. 6, 2000

(30) Foreign Application Priority Data

Jun. 27, 1998 (DE) .................................. 198 28 797

(51) Int. Cl.⁷ .................. C08L 59/02; C08L 61/28; C08K 5/13; C08K 5/101; C08K 3/34
(52) U.S. Cl. .................. 524/353; 524/210; 524/230; 524/315; 524/318; 524/349; 524/351; 524/352; 524/456; 524/542; 524/593; 524/145
(58) Field of Search .................. 524/315, 210, 524/230, 318, 349, 351, 352, 456, 542, 593, 353, 146

(56) References Cited

U.S. PATENT DOCUMENTS

| | | | |
|---|---|---|---|
| 3,775,363 A | | 11/1973 | Braunstein |
| 4,230,606 A | * | 10/1980 | Amann et al. ............... 525/414 |
| 4,360,617 A | | 11/1982 | Mueler |
| 4,386,178 A | * | 5/1983 | Schuette et al. ............ 524/542 |
| 4,647,609 A | * | 3/1987 | O'Brien ...................... 524/318 |
| 4,837,400 A | * | 6/1989 | Walter et al. ............... 524/145 |
| 5,128,405 A | * | 7/1992 | Sugiyama .................... 524/593 |
| 5,191,006 A | * | 3/1993 | Matsumoto et al. ........ 524/310 |
| 5,232,969 A | * | 8/1993 | Murao et al. ............... 524/593 |
| 5,364,900 A | * | 11/1994 | Hata et al. .................. 524/542 |
| 5,446,086 A | * | 8/1995 | Sugiyama et al. .......... 524/542 |
| 5,948,844 A | * | 9/1999 | Oka et al. ................... 524/400 |
| 6,051,660 A | * | 4/2000 | Oka ............................ 524/593 |

FOREIGN PATENT DOCUMENTS

| | | |
|---|---|---|
| DE | 2 319 359 | 11/1973 |
| DE | 27 02 661 | 8/1977 |
| DE | 30 11 280 | 2/1981 |
| DE | 36 28 560 | 3/1988 |
| DE | 36 28 562 | 3/1988 |
| EP | 19 761 | 12/1980 |
| EP | 52 740 | 6/1982 |
| EP | 36 27 561 | 3/1988 |
| EP | 465 086 | 1/1992 |

OTHER PUBLICATIONS

JP Abst. 08199039.

* cited by examiner

*Primary Examiner*—Peter Szekely
(74) *Attorney, Agent, or Firm*—Keil & Weinkauf

(57) ABSTRACT

Thermoplastic polyoxymethylene molding materials containing

A) from 10 to 99.98% by weight of a polyoxymethylene homo- or copolymer

B) from 0.005 to 2% by weight of a sterically hindered phenol

C) from 0.001 to 2% by weight of a polyamide

D) from 0.002 to 2% by weight of an alkaline earth metal silicate or of an alkaline earth metal glycerophosphate E) from 0.01 to 5% by weight of at least one ester or amide of saturated or unsaturated aliphatic carboxylic acids of 10 to 40 carbon atoms with polyols or aliphatic saturated alcohols or amines of 2 to 40 carbon atoms or an ether which is derived from alcohols and ethylene oxide F) from 0 to 5% by weight of a melamine/formaldehyde condensate G) from 0 to 74% by weight of further additives, the sum of the percentages by weight of the components A) to G) being 100% in each case.

20 Claims, No Drawings

STABILIZED POLYOXYMETHYLENE MOULDING MATERIALS

The present invention relates to thermoplastic polyoxymethylene molding materials containing, as essential components, A) from 10 to 99.98% by weight of a polyoxymethylene homo- or copolymer B) from 0.005 to 2% by weight of a sterically hindered phenol C) from 0.001 to 2% by weight of a polyamide D) from 0.002 to 2% by weight of an alkaline earth metal silicate or of an alkaline earth metal glycerophosphate E) from 0.01 to 5% by weight of at least one ester or amide of saturated or unsaturated aliphatic carboxylic acids of 10 to 40 carbon atoms with polyols or aliphatic saturated alcohols or amines of 2 to 40 carbon atoms or an ether which is derived from alcohols and ethylene oxide F) from 0 to 5% by weight of a melamine/formaldehyde condensate G) from 0 to 74% by weight of further additives, the sum of the percentages by weight of the components A) to G) being 100% in each case.

The present invention furthermore relates to the use of such molding materials for the production of moldings of any type and to the moldings obtainable thereby.

Polyoxymethylene homo- and/or copolymers have long been known. The polymers have a number of excellent properties, making them suitable for a very wide range of industrial applications. Nevertheless, there has been no lack of attempts to find compositions for improving the processability, for example the flowability, solidification time, etc., and/or for improving the mechanical properties and the dimensional stability of moldings produced from such polymers.

According to DE-A-23 19 359, molding materials which consist of from 98 to 25% by weight of oxymethylene copolymers and from 2 to 75% by weight of acicular calcium metasilicate, the percentages by weight being based on the total material, have improved processability, dimensional stability and heat aging properties.

The prior art furthermore describes the stabilization of polyoxymethylene molding materials by suitable additives. For this purpose, antioxidants, for example sterically hindered phenol derivatives, are added to polyoxymethylene molding materials. Such phenol derivatives are listed, for example, in DE-A-27 02 661. EP-A-19 761 discloses glass fiber-reinforced polyoxymethylene molding materials which contain alkoxymethylmelamines for improving the impact strength. Polyoxymethylene molding materials which have been stabilized to the action of heat in the temperature range from 100 to 150° C. over a relatively long period are disclosed in EP-A-52 740, which describes the addition of a partially etherified special melamine/formaldehyde condensate. DE-A-3 011 280 describes stabilized oxymethylene copolymer materials which contain, as a stabilizer, a mixture of at least one amino-substituted triazine, at least one sterically hindered phenol and at least one metal-containing compound. The metal-containing compounds preferably comprise potassium hydroxide, calcium hydroxide, magnesium hydroxide or magnesium carbonate.

In spite of these measures, known polyoxymethylene molding materials have, for some applications, unsatisfactory thermal stability which adversely affects the processing to give moldings and, for example, contribute to deposits on the mold or to a deterioration in the mold release properties and/or, during subsequent use of the moldings, lead to discolorations and a decline in the mechanical properties. Another disadvantage is that the mixtures may also contain formaldehyde adducts which, on processing at elevated temperatures, may lead to an annoying odor owing to the elimination of formaldehyde.

DE-A 36 28 560, DE A-36 28 561 and DE A-36 28 562 disclose polyoxymethylene molding materials which contain, as stabilizers, a mixture of sterically hindered phenols and alkaline earth metal silicates and alkaline earth metal glycerophosphates. According to the description, polyamides may also be used as further co-stabilizers. Although these materials have relatively good heat stability, they are still in need of improvement with regard to the color quality.

It is an object of the present invention to provide polyoxymethylene molding materials which have better thermal stability during processing and at elevated temperatures of use. At the same time, it is intended to achieve better color constancy and permanent brightness of the color. Coating of the mold and formaldehyde emission are to be very substantially minimized during processing.

We have found that the object is achieved by the molding materials defined at the outset.

The novel molding materials contain, as component A), from 10 to 99.98, preferably from 30 to 99, in particular from 40 to 98, % by weight of a polyoxymethylene homo- or copolymer.

Such polymers are known per se to the person skilled in the art and are described in the literature.

Very generally, these polymers have at least 50 mol % of repeated units —$CH_2O$— in the polymer main chain.

Homopolymers are generally prepared by polymerizing formaldehyde or trioxane, preferably in the presence of suitable catalysts.

For the purposes of the present invention, polyoxymethylene copolymers are preferred as component A, in particular those which, in addition to the repeating units —$CH_2O$—, also contain up to 50, preferably from 0.1 to 20, in particular from 0.3 to 10, very particularly preferably from 2 to 6, mol % of repeating units

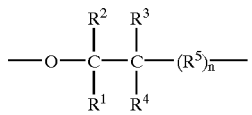

where $R^1$ to $R^4$, independently of one another, are each hydrogen, $C_1$- to $C_4$-alkyl or halogen-substituted alkyl of 1 to 4 carbon atoms and $R^5$ is —$CH_2$—, —$CH_2O$— or $C_1$- to $C_4$-alkyl- or $C_1$- to $C_4$-haloalkyl-substituted methylene or a corresponding oxymethylene group and n is from 0 to 3. Advantageously, these groups can be introduced into the copolymers by ring cleavage of cyclic ethers. Preferred cyclic ethers are those of the formula

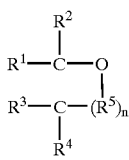

where $R^1$ to $R^5$ and n have the abovementioned meanings. Merely by way of example, ethylene oxide, 1,2-propylene oxide, 1,2-butylene oxide, 1,3-butylene oxide, 1,3-dioxane, 1,3-dioxolane and 1,3-dioxepan may be mentioned as cyclic ethers, and linear oligo- or polyformals, such as polydioxolane or polydioxepan, as comonomers.

Other suitable components A) are oxymethylene terpolymers which are prepared, for example, by reacting trioxane and one of the cyclic ethers described above with a third monomer, preferably bifunctional compounds of the formula

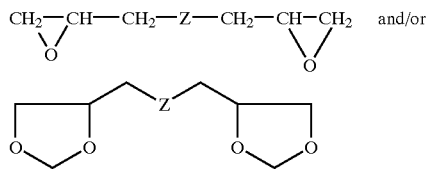 and/or where Z is a chemical bond, —O—, —ORO—(R=$C_1$- to $C_8$-alkylene or $C_2$- to $C_8$-cycloalkylene).

Preferred monomers of this type are ethylene diglycide, diglycidyl ether and diethers of glycidylene compounds and formaldehyde, dioxane or trioxane in the molar ratio 2:1 and diethers of 2 mol of glycidyl compound and 1 mol of an aliphatic diol of 2 to 8 carbon atoms, for example the diglycidyl ethers of ethylene glycol, 1,4-butanediol, 1,3-butanediol, cyclobutane-1,3-diol, 1,2-propanediol and cyclohexane-1,4-diol, to mention but a few examples.

Processes for the preparation of the homo- and copolymers described above are known to a person skilled in the art and are described in the literature, so that further information is superfluous here.

The preferred polyoxymethylene copolymers have melting points of at least 150° C. and weight average molecular weights $M_w$ of from 5000 to 200,000, preferably from 7000 to 150,000.

Polyoxymethylene polymers which are stabilized at the terminal groups and have C—C bonds at the chain ends are particularly preferred.

Suitable sterically hindered phenols B) are in principle all compounds which have a phenolic structure and possess at least one bulky group on the phenol ring.

For example, compounds of the formula

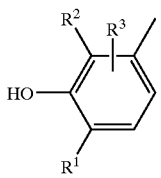

where $R^1$ and $R^2$ may be identical or different and are each alkyl, substituted alkyl or substituted triazolyl and $R^3$ is alkyl, substituted alkyl, alkoxy or substituted amino, are preferred.

Antioxidants of the stated type are described, for example, in DE-A-27 02 661 (U.S. Pat. No. 4,360,617).

A further group of preferred sterically hindered phenols are derived from substituted benzenecarboxylic acids, in particular from substituted benzenepropionic acids.

Particularly preferred compounds of this class are compounds of the formula

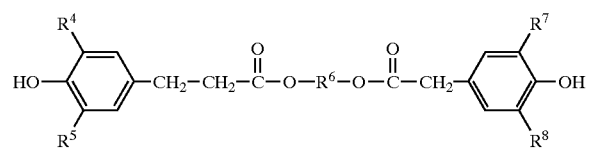

where $R^4$, $R^5$, $R^7$ and $R^8$, independently of one another, are each $C_1$–$C_8$-alkyl, which in turn may be substituted (at least one of them is a bulky group) and $R^6$ is a divalent aliphatic radical with 1 to 10 carbon atoms which may also have C—O bonds in the main chain.

Preferred compounds which correspond to these forms are

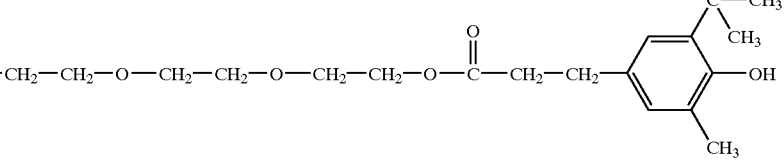

(Irganox® 245 from Ciba-Geigy)

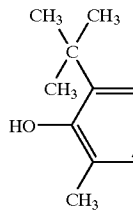
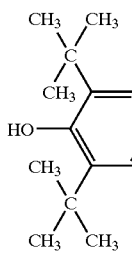
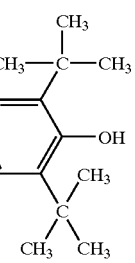

(Irganox® 259 from Ciba-Geigy)

Overall, the following may be mentioned as examples of sterically hindered phenols:

2,2'-methylenebis(4-methyl-6-tert-butylphenol), 1,6-hexanediol bis[3-(3,5-di-tert-butyl-4-hydroxyphenyl)propionate], pentaerythryl tetrakis[3-(3,5-di-tert-butyl-4-hydroxyphenyl)propionate], distearyl 3,5-di-tert-butyl-4-hydroxybenzyl phosphonate, 2,6,7-trioxa-1-phosphabicyclo[2.2.2]oct-4-ylmethyl 3,5-di-tert-butyl-4-hydroxyhydrocinnamate, 3,5-di-tert-butyl-4-hydroxyphenyl-3,5-distearylthiotriazylamine, 2-(2'-hydroxy-3'-hydroxy-3',5'-di-tert-butylphenyl)-5-chloro-benzotriazole, 2,6-di-tert-butyl-4-hydroxymethylphenol, 1,3,5-trimethyl-2,4,6-tris(3,5-di-tert-butyl-4-hydroxybenzyl)-benzene, 4,4'-methylenebis(2,6-di-tert-butylphenol), 3,5-di-tert-butyl-4-hydroxybenzyldimethylamine and N,N'-hexamethylenebis-3,5-di-tert-butyl-4-hydroxyhydrocinnamide.

Those which have proven particularly effective and are therefore preferably used are 2,2'-methylenebis(4-methyl-6-tert-butylphenol), 1,6-hexanediol bis-3-(3,5-di-tert-butyl-4-hydroxyphenyl)propionate [sic] (Irganox® 259), pentaerythrityl tetrakis[3-(3,5-di-tert-butyl-4-hydroxyphenyl)propionate] and the Irganox® 245 from Ciba Geigy, which is described above and is particularly suitable.

The antioxidants (B), which may be used individually or as mixtures, are contained in an amount of from 0.005 to 2, preferably from 0.05 to 2, in particular from 0.1 to 1, % by weight, based on the total weight of the molding materials A) to G).

In some cases, sterically hindered phenols having not more than one sterically hindered group in the ortho position relative to the phenolic hydroxyl group have proven particularly advantageous, especially when assessing the color stability on storage in diffuse light over prolonged periods.

The polyamides which may be used as components C) are known per se. Semicrystalline or amorphous resins, as described, for example, in Encyclopedia of Polymer Science and Engineering, Vol. 11, pages 315 to 489, John Wiley & Sons, Inc., 1988, can be used, the melting point of the polyamide preferably being less than 225° C., especially less than 215° C.

Examples of these are polyhexamethyleneazelamide, polyhexamethylenesebacamide, polyhexamethylenedodecanediamide, poly-11-aminoundecanamide and bis(p-aminocyclohexyl)methyldodecanediamide or the products obtained by ring cleavage of lactams, e.g. polycaprolactam or polylaurolactam. Polyamides based on terephthalic or isophthalic acid as the acid component and/or trimethylhexamethylenediamine or bis(p-aminocyclohexyl)propane as the diamine component and polyamide base resins which have been prepared by copolymerizing two or more of the abovementioned polymers or components thereof are also suitable.

Copolyamides based on caprolactam, hexamethylenediamine, p,p'-diaminodicyclohexylmethane and adipic acid may be mentioned as particularly suitable polyamides. An example of these is the product sold under the name Ultramid® 1C by BASF Aktiengesellschaft.

Further suitable polyamides are sold by Du Pont under the name Elvamide®.

The preparation of these polyamides is likewise described in the abovementioned publication. The ratio of terminal amino groups to terminal acid groups can be controlled by varying the molar ratio of the starting compounds.

The amount of the polyamide in the novel molding material is from 0.001 to 2, preferably from 0.005 to 1.99, especially from 0.01 to 0.08, % by weight.

In many cases, the dispersibility of the polyamides used can be improved by the presence of a polycondensate of 2,2-di(4-hydroxyphenyl)propane (bisphenol A) and epichlorohydrin.

Such condensates of epichlorohydrin and bisphenol A are commercially available. Processes for their preparation are likewise known to a person skilled in the art. Trade names of the polycondensates are Phenoxy® (from Union Carbide Corporation) and Epikote® (from Shell). The molecular weight of the polycondensates may vary within wide limits; in principle, the commercially available types are all suitable.

The novel polyoxymethylene molding materials contain, as component D), from 0.002 to 2.0, preferably from 0.005 to 0.5, in particular from 0.01 to 0.3, % by weight, based on the total weight of the molding materials, of one or more of the alkaline earth metal silicates and/or alkaline earth metal glycerophosphates. Preferably calcium and in particular magnesium have proven very useful as alkaline earth metals for the formation of the silicates and glycerophosphates. Calcium glycerophosphate and preferably magnesium glycerophosphate and/or calcium silicate and preferably magnesium silicate are expediently used, particularly preferred alkaline earth metal silicates being those of the formula

$$Me.xSiO_2.nH_2O$$

where

Me is an alkaline earth metal, preferably calcium or in particular magnesium, x is from 1.4 to 10, preferably from 1.4 to 6, and n is greater than or equal to 0, preferably from 0 to 8.

The compounds D) are advantageously used in finely milled form. Products having an average particle size of less than 100 μm, preferably less than 50 μm, are particularly suitable.

Preferred calcium and magnesium silicates and/or calcium and magnesium glycerophosphates can be specified, for example, by the following characteristic data:

Calcium silicate and magnesium silicate:
content of CaO and MgO, respectively: from 4 to 32, preferably from 8 to 30, in particular from 12 to 25, % by weight, molar $SiO_2$: CaO and $SiO_2$:MgO ratios, respectively: from 1.4 to 10, preferably from 1.4 to 6, in particular from 1.5 to 4, bulk density: from 10 to 80, preferably from 10 to 40, g/100 ml, and average particle size: less than 100 μm, preferably less than 50 μm, and calcium and magnesium glycerophosphates:
content of CaO and MgO, respectively: greater than 70, preferably greater than 80, % by weight,
residue on ignition: from 45 to 65% by weight,
melting point: greater than 300° C. and
average particle size: less than 100 μm, preferably less than 50 μm.

The novel molding materials contain, as component E), from 0.01 to 5, preferably from 0.09 to 2, in particular from 0.1 to 0.7, of at least one ester or amide of saturated or unsaturated aliphatic carboxylic acids of 10 to 40, preferably 16 to 22, carbon atoms with polyols or aliphatic saturated alcohols or amines of 2 to 40, preferably 2 to 6, carbon atoms or with an ether which is derived from alcohols and ethylene oxide.

The carboxylic acids may be monobasic or dibasic. Examples are pelargonic acid, palmitic acid, lauric acid, margaric acid, dodecandioic acid, behenic acid and particularly preferably stearic acid, capric acid and montanic acid (mixture of fatty acids of 30 to 40 carbon atoms).

The aliphatic alcohols may be monohydric to tetrahydric. Examples of alcohols are n-butanol, n-octanol, stearyl alcohol, ethylene glycol, propylene glycol, neopentyl glycol and pentaerythritol, glycerol and pentaerythritol being preferred.

The aliphatic amines may be monofunctional to trifunctional. Examples of these are stearylamine, ethylenediamine, propylenediamine, hexamethylenediamine and di(6-aminohexyl)amine, ethylenediamine and hexamethylenediamine being particularly preferred. Preferred esters or amides are accordingly glyceryl distearate, glyceryl tristearate, ethylenediamine distearate, glyceryl monopalmittate [sic], glyceryl trilaurtate [sic], glyceryl monobehenate and pentaerythrityl tetrastearate.

Mixtures of different esters or amides or esters with amides in combination may also be used, any desired mixing ratio being possible.

Also suitable are polyetherpolyols or polyesterpolyols which are esterified or etherified with mono- or polybasic carboxylic acids, preferably fatty acids. Suitable products are commercially available, for example as Loxiol® EP 728 from Henkel KGaA.

Preferred ethers, which are derived from alcohols and ethylene oxide, are of the general formula $$RO(CH_2CH_2O)_nH$$

where R is alkyl of 6 to 40 carbon atoms and n is an integer greater than or equal to 1. Particularly preferably, R is a saturated $C_{16}$ to $C_{18}$ fatty alcohol with n≈50, which is commercially available as Lutensol® AT 50 from BASF.

The novel molding materials can contain, as component F), from 0 to 5, preferably from 0.001 to 5, more preferably from 0.01 to 3, in particular from 0.05 to 1% by weight of a melamine/formaldehyde condensate. This is preferably a precipitated condensate in finely divided form which is cross-linked and water-insoluble. The molar ratio of formaldehyde to melamine is preferably from 1.2:1 to 10:1, in particular from 1.2:1 to 2:1. The composition and processes for the preparation of each condensate are as described in DE-A 25 40 207 which corresponds to U.S. Pat. No. 4,230,606.

The novel molding materials can contain, as component G), from 0 to 74, preferably from 0 to 50, in particular from 0 to 40, % by weight of further additives.

The novel molding materials can contain, as component G), from 0.0001 to 1, preferably from 0.001 to 0.8, in particular from 0.01 to 0.3, % by weight of a nucleating agent which differs from D) and E).

Suitable nucleating agents are all known compounds, for example melamine cyanurate, boron compounds, such as boron nitride, silica, pigments, e.g. Heliogenblau® (copper phthalocyanine pigment, registered trademark of BASF Aktiengesellschaft) or branched polyoxymethylenes which, in these small amounts, have a nucleating effect.

In particular, talc, which is a hydrated magnesium silicate having the composition $Mg_3[(OH)_2/Si_4O_{10}]$ or $MgO.4SiO_2.H_2O$ is used as a nucleating agent. These three-layer phyllosilicates have a triclinic, monoclinic or rhombic crystal structure and are of lamellar form. Mn, Ti, Cr, Ni, Na and K may be present as further trace elements, it being possible for some of the OH groups to be replaced by fluoride.

Talc in which 100% of the particles has sizes of <20 μm is particularly preferably used. The particle size distribution is usually determined by sedimentation analysis and is preferably:

<20 μm 100% by weight
<10 μm 99% by weight
<5 μm 85% by weight
<3 μm 60% by weight
<2 μm 43% by weight Such products are commercially available as Micro-Talc I.T. extra (from Norwegian Talc Minerals).

Fillers (which differ from D)) in amounts of up to 50, preferably from 5 to 40, % by weight are, for example, potassium titanate whiskers, carbon fibers and preferably glass fibers, it being possible to use the glass fibers, for example, in the form of woven glass fabrics, glass mats, glass surface mats and/or glass rovings or chopped glass fibers of low-alkali E glass having a diameter of from 5 to 200 μm, preferably from 8 to 50 μm, and the fibrous fillers preferably having a mean length of from 0.05 to 1 μm, in particular from 0.1 to 0.5 μm, after their incorporation.

Other suitable fillers are, for example, calcium carbonate or glass beads, preferably in milled form, or mixtures of these fillers.

Examples of further additives, in amounts of up to 50, preferably from 0 to 40, % by weight, are polymeric impact modifiers (also referred to below as elastomeric polymers or elastomers).

Preferred types of such elastomers are the ethylene/propylene (EPM) and ethylene/propylene/diene (EPDM) rubbers.

EPM rubbers generally have virtually no double bonds whereas EPDM rubbers may have from 1 to 20 double bonds per 100 carbon atoms.

Examples of diene monomers for EPDM rubbers are conjugated dienes, such as isoprene and butadiene, nonconjugated dienes of 5 to 25 carbon atoms such as penta-1,4-diene, hexa-1,4-diene, hexa-1,5-diene, 2,5-dimethylhexa-1,5-diene and octa-1,4-diene, cyclic dienes, such as cyclopentadiene, cyclohexadienes, cyclooctadienes and dicyclopentadiene, and alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0.2.6]-3,8-decadiene, or mixtures thereof. Hexa-1,5-diene-5-ethylidenenorbornene [sic] and dicyclopentadiene are preferred. The diene content of the EPDM rubbers is preferably from 0.5 to 50, in particular from 1 to 8, % by weight, based on the total weight of the rubber.

The EPDM rubbers may also be grafted with further monomers, for example with glycidyl (meth)acrylates, (meth)acrylic esters and (meth)acrylamides.

A further group of preferred rubbers comprises copolymers of ethylene with esters of (meth)acrylic acid. In addition, the rubbers may also comprise epoxy-containing monomers. These epoxy-containing monomers are preferably incorporated in the rubber by adding to the monomer mixture epoxy-containing monomers of the general formula (I) or (II)

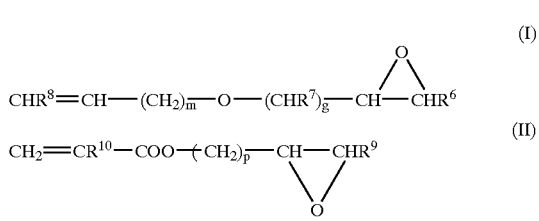

where $R^6$–$R^{10}$ are each hydrogen or alkyl of 1 to 6 carbon atoms and m is an integer from 0 to 20, g is an integer from 0 to 10 and p is an integer from 0 to 5.

Preferably, $R^6$ to $R^8$ are each hydrogen, m being 0 or 1 and g being 1. The corresponding compounds are allyl glycidyl ethers and vinyl glycidyl ethers.

Preferred compounds of the formula II are epoxy-containing esters of acrylic acid and/or methacrylic acid, such as glycidyl acrylate and glycidyl methacrylate.

Advantageously, the copolymers comprise from 50 to 98% by weight of ethylene and from 0 to 20% by weight of epoxy-containing monomers, the remaining amount consisting of (meth)acrylic esters.

Copolymers of

| | |
|---|---|
| from 50 to 98, | in particular from 55 to 95, % by weight of ethylene, in particular from 0.3 to 20% by weight of glycidyl acrylate, and/or |
| from 0 to 40, | in particular from 0.1 to 20, % by weight of glycidyl methacrylate and |
| from 1 to 50, | in particular from 10 to 40, % by weight of n-butyl acrylate and/or 2-ethylhexyl acrylate | are particularly preferred.

Further preferred esters of acrylic and/or methacrylic acid are the methyl, ethyl, propyl, isobutyl and tert-butyl esters.

Vinyl esters and vinyl ethers may also be used as comonomers.

The ethylene copolymers described above can be prepared by processes known per se, preferably by random copolymerization under superatmospheric pressure and at elevated temperatures. Appropriate processes are generally known.

Other preferred elastomers are emulsion polymers, the preparation of which is described, for example, by Blackley in the monograph Emulsion Polymerization. The emulsifiers and catalysts which may be used are known per se.

In principle, elastomers having a homogeneous composition or those having a shell structure may be used. The shell-like structure is determined by the order of addition of the individual monomers; the morphology of the polymers, too, is influenced by this order of addition.

Acrylates, e.g. n-butyl acrylate and 2-ethylhexyl acrylate, corresponding methacrylates, butadiene and isoprene and mixtures thereof may be mentioned here merely as typical monomers for the production of the rubber part. These monomers can be copolymerized with other monomers, e.g. styrene, acrylonitrile, vinyl ethers and further acrylates or methacrylates, such as methyl methacrylate, methyl acrylate, ethyl acrylate and propyl acrylate.

The soft or rubber phase (having a glass transition temperature of less than 0° C.) of the elastomers may comprise the core, the outer shell or a middle shell (in the case of elastomers having a structure comprising more than two shells); in the case of multi-shell elastomers, a plurality of shells may also consist of a rubber phase.

If the elastomer is composed not only of the rubber phase but also of one or more hard components (having glass transition temperatures of more than 20° C.), these are generally prepared by polymerization of styrene, acrylonitrile, methacrylonitrile, α-methylstyrene, p-methylstyrene, acrylates and methacrylates such as methyl acrylate, ethyl acrylate and methyl methacrylate, as main monomers. Here too, smaller amounts of further comonomers may be used.

In some cases, it has proven advantageous to use emulsion polymers which have reactive groups at the surface. Such groups are, for example, epoxy, amino or amido groups and functional groups which can be introduced by using monomers of the general formula

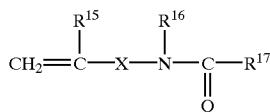

where $R^{15}$ is hydrogen or $C_1$- to $C_4$-alkyl, $R^{16}$ is hydrogen, $C_1$- to $C_8$-alkyl or aryl, in particular phenyl, $R^{17}$ is hydrogen, $C_1$- to $C_{10}$-alkyl, $C_6$- to $C_{12}$-aryl or —$OR_{18}$, $R^{18}$ is $C_1$- to $C_8$-alkyl or $C_6$- to $C_{12}$-aryl, each of which may be substituted by O— or N-containing groups and x is a chemical bond, $C_1$- to $C_{10}$-alkylene or $C_6$–$C_{12}$-arylene or

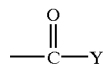

The graft monomers described in EP-A 208 187 are also suitable for introducing reactive groups at the surface.

Acrylamide, methacrylamide and substituted esters of acrylic acid or methacrylic acid such as (N-tert-butylamino) ethyl methacrylate, (N,N-dimethylamino)ethyl acrylate, (N,N-dimethylamino)methyl acrylate and (N,N-diethylamino)ethyl acrylate, may be mentioned as further examples.

Furthermore, the particles of the rubber phase may also be crosslinked. Monomers having crosslinking activity are, for example, buta-1,3-diene, divinylbenzene, diallyl phthalate and dihydrodicyclopentadienyl acrylate and the compounds described in EP-A 50 265.

Graft-linking monomers, i.e. monomers having two or more polymerizable double bonds which react at different rates in the polymerization, may also be used. Preferably used compounds of this type are those in which at least one reactive group polymerizes at about the same rate as the other monomers whereas the other reactive group (or reactive groups) polymerizes (polymerize), for example, substantially more slowly. The different polymerization rates result in a certain fraction of unsaturated double bonds in the rubber. A further phase is then grafted onto such a rubber, some or all of the double bonds present in the rubber then react with the graft monomers with formation of chemical bonds, i.e. the grafted-on phase is at least partly linked to the grafting base via chemical bonds.

Examples of such graft-linking monomers are allyl-containing monomers, in particular allyl esters of ethylenically unsaturated carboxylic acids such as allyl acrylate, allyl methacrylate, diallyl maleate, diallyl fumarate, diallyl itaconate and the corresponding monoallyl compounds of these dicarboxylic acids. There is also a large number of further suitable graft-linking monomers; for further details, reference may be made here, for example, to U.S. Pat. No. 4,148,846.

In general, the proportion of these crosslinking monomers in component G) is up to 5, preferably not more than 3, % by weight, based on G).

Some preferred emulsion polymers are mentioned below. Here, graft polymers which have a core and at least one outer shell and possess the following composition may be mentioned first:

| Monomers for the core | Monomers for the shell |
|---|---|
| buta-1,3-diene, isoprene, n-butyl acrylate, ethylhexyl acrylate or mixtures thereof, | styrene, acrylonitrile, (meth)-acrylates, if required with reactive groups as described |

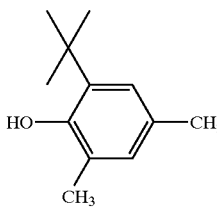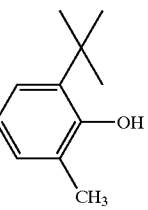

-continued

| Monomers for the core | Monomers for the shell |
|---|---|
| if required together with crosslinking monomers | herein |

Instead of graft polymers having a multi-shell structure, it is also possible to use homogeneous, i.e. single-shell, elastomers of buta-1,3-diene, isoprene and n-butyl acrylate or copolymers thereof. These products too can be prepared by using crosslinking monomers or monomers having reactive groups.

The elastomers D) described can also b e prepared by other conventional methods, for example by suspension polymerization.

Examples of further suitable elastomers are thermoplastic polyurethanes, as described, for example, in EP-A 115 846 and EP-A 115 847 and EP-A 117 664.

It is of course also possible to use mixtures of the abovementioned rubber types.

The novel molding material s m ay contain further conventional additives and processing assistants. Formaldehyde scavengers, plasticizers, adhesion promoters and pigments may be mentioned here merely by way of example. The amount of such additives is in general from 0.001 to 5% by weight.

The novel thermoplastic molding materials are prepared by mixing the components in a manner known per se, so that further details are superfluous here. The mixing of the components is advantageously carried out in an extruder.

The novel thermoplastic molding materials have a balanced property spectrum and exhibit very good thermal stability, resulting in little coating of the mold and discolorations during processing. Such shaped articles are therefore particularly suitable for use as moldings such as chain links, rollers, slide rails or gear wheels.

EXAMPLES

The following components were used:
Component A)
Polyoxymethylene copolymer comprising 97% by weight of trioxane and 3% by weight of butanediol formal. The product also contained about 3% by weight of unconverted trioxane and 5% by weight of thermally unstable fractions. After degradation of the thermally unstable fractions the copolymer had an MVR of 6 ml/10 min (190° C., 2.16 kg according to ISO 1133/B).

Component B)

Irganox® from Ciba-Geigy:

Component C)
Polyamide oligomer having a molecular weight of about 3000, prepared from caprolactam, hexamethylenediamine, adipic acid and propionic acid (as molecular weight regulator) similarly to Examples 5-4 of U.S. Pat. No. 3,960, 984 (PA-dicapped).
Component D)
Synthetic magnesium silicate (Ambosol® from Société Nobel, Puteaux), having the following properties:
  Content of MgO≧14.8% by weight
  Content of SiO2[sic]≧59% by weight
  Molar Sio2[sic]: MgO ratio 2.7 mol/mol
  Bulk density 20 to 30 g/100 m [sic]
  Loss on ignition: <25% by weight
Components E)
  E1: Loxiol® 1206 from Henkel KGaA (glyceryl distearate)
  E2: Loxiol®EP 728 from Henkel KGaA (polyol fatty ester)
  E3: Lutensol®AT 50 from BASF (RO(CH$_2$CH$_2$)$_x$H; R=saturated linear C$_{16}$–C$_{18}$ fatty alcohol) x=50
  E4: Syntewax from Henkel KGaA (ethylenediamine distearate)
Component F)
A melamin/formaldehyde condensate according to Example 1 of DE-A 25 40 207 which corresponds to U.S. Pat. No. 4,230,606.

For the preparation of molding materials, component A was mixed with the amounts of components B to F stated in the table, in a dry blender at 23° C. The mixture thus obtained was introduced into a twin-screw extruder having a devolatilization apparatus (ZSK 25 from Werner & Pfleiderer), homogenized at 230° C. and devolatilized, and the homogenized mixture was extruded through a die and the extrudate was granulated.

For testing the heat stability, the following were determined:
  WL N$_2$: The weight loss in percent of a sample of 1.2 g of granules on heating for 2 hours at 220° C. under nitrogen,
  WL air: Weight loss in percent of a sample of 1.2 g of granules on heating for 2 hours at 220° C. under air.
  The MVR was determined according to ISO 1133/B.
  The compositions of the molding materials and the results of the measurements are shown in the table.

TABLE

| Components | Example | 1 | 1 V | 2 | 2 V |
|---|---|---|---|---|---|
| A | % by wt. | 99.21 | 99.26 | 99.41 | 99.25 |
| B | % by wt. | 0.35 | 0.35 | 0.35 | 0.35 |
| C | % by wt. | 0.04 | 0.04 | 0.04 | — |
| D | % by wt. | 0.05 | — | 0.05 | 0.05 |
| F | % by wt. | 0.20 | 0.20 | — | 0.20 |
| E1 | % by wt. | 0.15 | 0.15 | 0.15 | 0.15 |
| E2 | % by wt. | — | — | — | — |
| E3 | % by wt. | — | — | — | — |
| E4 | % by wt. | — | — | — | — |
| Analysis: | | | | | |
| Weight losses 2 h: | | | | | |
| $N_2$ | [%] | 0.15 | 0.42 | 0.19 | 0.07 |
| Air | [%] | 1.35 | 6.41 | 1.72 | 3.28 |
| MVR | [ml/10 min] | 6.35 | 5.56 | 5.83 | 5.69 |

| Components | Example | 3 V | 3 | 4 | 5 |
|---|---|---|---|---|---|
| A | % by wt. | 99.36 | 99.21 | 99.21 | 99.21 |
| B | % by wt. | 0.35 | 0.35 | 0.35 | 0.35 |
| C | % by wt. | 0.04 | 0.04 | 0.04 | 0.04 |
| D | % by wt. | 0.05 | 0.05 | 0.05 | 0.05 |
| F | % by wt. | 0.20 | 0.20 | 0.20 | 0.20 |
| E1 | % by wt. | — | — | — | — |
| E2 | % by wt. | — | 0.15 | — | — |
| E3 | % by wt. | — | — | 0.15 | — |
| E4 | % by wt. | — | — | — | 0.15 |
| Weight losses | | | | | |
| $N_2$ | [%] | 0.24 | 0.15 | 0.08 | 0.07 |
| Air | [%] | 1.65 | 1.20 | 1.42 | 1.26 |
| MVR | [ml/10 min] | 6.10 | 5.72 | 6.04 | 5.96 |

We claim:

1. A thermoplastic polyoxymethylene molding material comprising

A from 10 to 99.98% by weight of a polyoxymethylene homo- or copolymer,

B from 0.005 to 2% by weight of a sterically hindered phenol,

C from 0.001 to 2% by weight of a polyamide,

D from 0.002 to 2% by weight of an alkaline earth metal silicate or of an alkaline earth metal glycerophosphate, E from 0.01 to 5% by weight of at least one ester or amide of saturated or unsaturated aliphatic carboxylic acids of 10 to 40 carbon atoms polyols or aliphatic saturated alcohols or amines of 2 to 40 carbon atoms or an ether which is derived from alcohols and ethylene oxide, and F from 0.001 to .5% by weight of a crosslinked melamine/formaldehyde condensate.

2. The molding material defined in claim 1, wherein component B is a sterically hindered phenol having not more than one sterically hindered group in the ortho position relative to the phenolic group.

3. The molding material defined in claim 1, in which component E) consists of ethylenediamine distearate, glycidyl distearate, polyetherpolyol fatty esters, polyesterpolyol fatty esters or an ether of the formula RO(CH$_2$CH$_2$O)$_n$H where R is alkyl of 6 to 40 carbon atoms and n is greater than or equal to 1.

4. The molding material defined in claim 1, in which the alkaline earth silicate of component D is of the formula Me·xSiO$_2$·nH$_2$O where Me is an alkaline earth metal x is from 1.4 to 10 and n is greater than or equal to 0.

5. A fiber, film or molding prepared from the molding material defined in claim 1.

6. A molding produced from the molding material defined in claim 1.

7. The molding material defined in claim 1, containing nucleating agents as further additives G) selected from the group consisting of melamine cyanurate, boron nitride, silica, copper phthalocyanine pigment, branched polyoxymethylenes, and talc.

8. The molding material defined in claim 1, containing as further additives G) selected from the group consisting of fillers and impact modifiers.

9. The molding material defined in claim 1, wherein component E) is at least one ester of unsaturated aliphatic carboxylic acids of 10 to 40 carbon atoms with polyols or aliphatic saturated alcohols.

10. The molding material defined in claim 1, wherein component E) is at least one amide amines of 2 to 40 carbon atoms.

11. The molding material defined in claim 1, wherein component E) is at least one ether which is derived from alcohols and ethylene oxide.

12. A thermoplastic molding material comprising

A from 10 to 99.98% by weight of a polyoxymethylene homo- or copolymer,

B from 0.005 to 2% by weight of a sterically hindered phenol,

C from 0.001 to 2% by weight of a polyamide,

D from 0.002 to 2% by weight of an alkaline earth metal silicate or of an alkaline earth metal glycerophosphate, E from 0.01 to 5% by weight of at least one ester or amide of saturated or unsaturated aliphatic carboxylic acids of 10 to 40 carbon atoms polyols or aliphatic saturated alcohols or amines of 2 to 40 carbon atoms or an ether which is derived from alcohols and ethylene oxide, and F from 0.001 to 5% by weight of a melamine/formaldehyde condensate, in which component F) is composed of a crosslinked, water-insoluble precipitated polycondensate of formaldehyde and melamine in a molar ratio of 1.2:1 to 10:1.

13. The molding material defined in claim 12, wherein component B is a sterically hindered phenol having not more than one sterically hindered group in the ortho position relative to the phenolic group.

14. A fiber, film or molding prepared from the molding material defined in claim 12.

15. A molding produced from the molding material defined in claim 12.

16. A thermoplastic polyoxymethylene molding material comprising

A from 10 to 99.98% by weight of a polyoxymethylene homo- or copolymer,

B from 0.005 to 2% by weight of a sterically hindered phenol,

C from 0.001 to 2% by weight of a polyamide,

D from 0.002 to 2% by weight of an alkaline earth metal silicate or of an alkaline earth metal glycerophosphate, E from 0.01 to 5% by weight of at least one ester of saturated or unsaturated aliphatic carboxylic acids of 10 to 40 carbon atoms polyols or aliphatic saturated alcohols of 2 to 40 carbon atoms or an ether which is derived from alcohols and ethylene oxide, and F from 0.001 to 5% by weight of a crosslinked melamine/formaldehyde condensate.

17. The molding material defined in claim 16, in which component F) is composed of a crosslinked, water-insoluble precipitated polycondensate of formaldehyde and melamine in a molar ratio of 1.2:1 to 10:1.

18. The molding material.defined in claim 16, wherein component B is a sterically hindered phenol having not more than one sterically hindered group in the ortho position relative to the phenolic group.

19. A fiber, film or molding prepared from the molding material defined in claim 16.

20. A molding produced from the molding material defined in claim 16.

* * * * *